PROCESS OF PRINTING NUMBERS ON FORMS
Original Filed Sept. 20, 1965
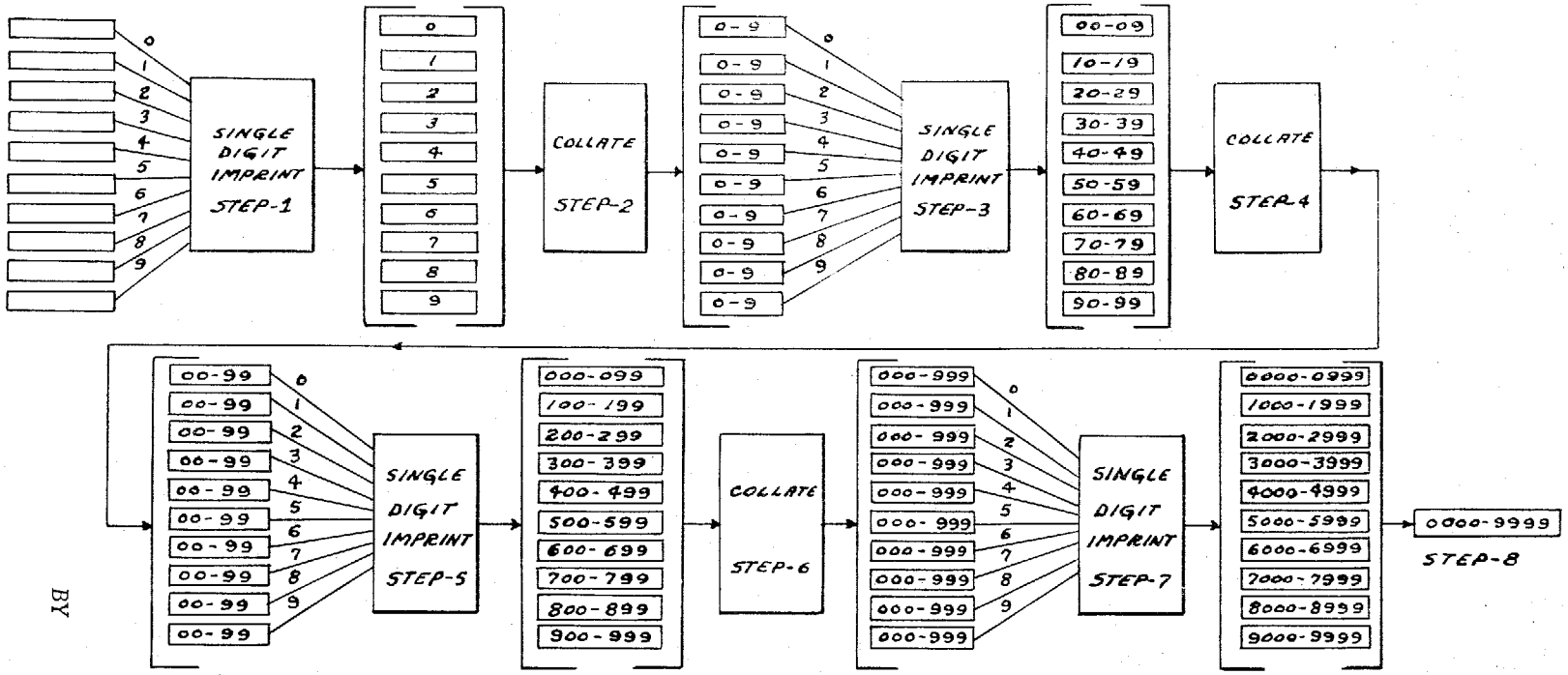
INVENTOR
ARTHUR S. FOLINO
BY Jerome P. Bloom
ATTORNEY United States Patent Office Re. 27,298
Reissued Feb. 22, 1972

27,298

PROCESS OF PRINTING NUMBERS ON FORMS

Arthur S. Folino, 444 Stone Mill Road,
Dayton, Ohio 45409

Original No. 3,421,752, dated Jan. 14, 1969, Ser. No. 488,331, Sept. 20, 1965. Application for reissue Jan. 20, 1970, Ser. No. 4,431
Int. Cl. B41f *13/54;* B41l *45/00;* B65h *45/16*
U.S. Cl. 270—1 13 Claims

Matter enclosed in heavy brackets [ ] appears in the original patent but forms no part of this reissue specification; matter printed in italics indicates the additions made by reissue.

ABSTRACT OF THE DISCLOSURE

A method of applying consecutive numbers of multiple denominational position to ticket and like forms without the use of numbering devices, including steps of imprinting in successive denominational positions and of collating the ticket forms intermediate imprinting operations to form numerically related groups and sets within groups.

This invention relates to the art of numbering, and particularly to a method of imprinting or otherwise applying consecutive numbers of multiple denominational position.

In the numbering of printed forms, tickets and the like it is known to use numbering devices which accomplish the consecutive numbering of forms in connection with or independently of other printing. These devices have certain disadvantages. They are relatively high in cost. They are an added machine unit requiring storing and maintaining. They lack flexibility in the matter of size and location of the desired number imprint and they may be inadequate to print numbers to the desired high value.

It is an object of the instant invention to accomplish consecutive numbering as described without the use of numbering devices.

Another object of the invention is to provide a method whereby numbers of any size and in any position on a sheet may be printed consecutively without the use of numbering machines.

A further object of the invention is to permit a number of any high value to be printed.

Still another object of the invention is to provide a method of numbering as described utilizing a minimum of apparatus and requiring relatively simple procedures for the performance thereof.

The drawing is a diagram, in the nature of a flow chart, showing steps of the invention in accordance with a disclosed embodiment thereof.

The invention is thus concerned with the printing of numbers of any size and in any position on a sheet of paper or other material, numbered consecutively through seven denominational positions if desired. By way of illustration the invention is disclosed as operating consecutively to number ten thousand pre-printed forms using the numbers 0000 to 9999.

To begin the method the ten thousand printed forms are divided into ten stacks or groups of equal number. Thus, and referring to the start of the flow chart, the vertical series of blank rectangular boxes each represents a group of one thousand forms. These groups are put one at a time through a single digit imprint station in a process identified as Step No. 1. The imprinter, which may be any conventional means of impressing a numeral designation, applies, as noted, but a single digit. The forms are located with respect to the imprint means so that the imprint of the digit occurs in a position corresponding to the lowest denominational position of the number finally to be impressed on the form. Further, after each group of forms passes through the imprinting station, the number is changed so that the next successive group will have a different digit impressed thereon. As a matter of convenience and uniformity the forms of the first group will be imprinted with a zero, the forms of the second group with a one and so on, with the forms of the teeth group receiving the impression of a 9 thereon. Following imprinting, and while the described groups retain their initial formation, the several groups of forms appear as indicated at the conclusion of Step No. 1 where a first group of 1,000 forms bears the numeral zero in its lowest denominational position, the next group similarly bears a 1 and successive groups bear respective designations 2 through 9. In a further step, identified as Step No. 2, the described groups are separated in a collating process and reassembled into another ten groups. In each of these is 100 stacked sets of forms, each set comprising forms consecutively numbered from zero through 9. Thus all of the several groups are comprised of sets of forms of like numerical order.

Now in a further step, identified as Step No. 3, the described groups are again put through the single digit imprint station, being laterally displaced one interval to the right in the example illustrated, with different digits zero through 9 being used in connection with the respective groups. This imprint occurs, and the imprint means and the forms are so aligned to accomplish this, in the next higher denominational position. Thus, a first group of stack of 100 sets of forms is put through the printer and has a zero imprinted thereon. A second stack has a 1 imprinted thereon and so on through the numeral 9 which is imprinted on the forms of the tenth stack or group.

As the forms emerge from this imprint step they continue to form the same ten groups of forms, 100 sets to the group, ten forms to the set. In Group No. 1 each set comprises forms numbered 00–01–02 etc., through 09. In stack No. 2 each set comprises forms numbered 10–11–12 etc. through 19. This continues through the successive groups, with the tenth group comprising sets each of which contains forms numbered 90 to 99.

Processing to a further collating process, the described groups of forms are separated and reassembled into other groups of like numerical order. In carrying out this operation, the first stack is separated into its component sets, each comprising forms numbered 00 to 09. The remaining groups similarly are separated. Now each set from Group No. 2 is placed on a corresponding set from Group No. 1, sets from Group No. 3 are placed on corresponding sets of Group No. 2, etc. This results in formation of 100 stacks of forms, there being 100 forms in each stack numbered 00 to 99.

In a still further step, identified as Step No. 5, ten of the stacks formed in Step No. 4, which together comprise a group, are run through the imprinting means, laterally displaced to the right a further interval, and have a zero printed in the third denominational position. Ten more stacks are put through the imprinter to have 1 printed in the third denominational position and so on through the remaining stacks, with the last ten stacks constituting the final group, having a 9 imprinted in the third denominational position. Step No. 5 thus produces, as indicated, ten groups of forms, cash group comprising ten sets of 100 each. Thus, the forms o fthe first stack are, in sets of 100, numbered 000 to 099. Forms of the second stack, in sets of 100, are numbered 100 to 199 etc. with the final group being comprised of sets of 100 each of which is numbered 900 to 999.

Continuing to a still further collating step, designated Step No. 6, each group is separated into its component sets. Each group thus forms ten stacks. In the collating process a set or stack from Group No. 2 is placed on a corresponding set or stack of Group No. 1—sets or stacks from Groups No. 3 and No. 4 are added and so on. The result is to produce ten groups of forms, the forms of each group being consecutively numbered from 000 to 999.

Now, in a final imprint operation the described groups are again put through the single digit imprint station, laterally displaced a third interval, using a different number in connection with each group as before. A first group formed as in Step No. 6 is put through the imprinter with each form thereof having a zero imprinted thereon in the fourth denominational position. A second group is run through the imprinter and the forms thereof have a 1 imprinted thereon also in the fourth denominational position. The other groups follow and are consecutively numbered with the final group having a 9 imprinted in the fourth denominational position on each form thereof. There is in this manner produced ten groups of forms respectively 0000–0999 to 9000–9999. That is, the forms of Group No. 1 are numbered 0000 to 0999. The forms of Group No. 2 are numbered 1000 to 1999 and so on with the forms of Group No. 10 being numbered 9000 to 9999.

Finally, the several groups produced by Step No. 7 are superimposed upon one another in numerical order to produce as indicated in Step No. 8 a single group of forms consecutively numbered from 0000 to 9999.

It will be understood that the process as described may be continued to produce a great ramber of consecutively numbered forms, or, alternatively, may be limited to produce a lesser number. For example, in accordance with a customer's requirements, forms may be produced numbered anywhere within the range of 000–999 to 000000–999999, that is, consecutive numbers from a thousand to a million. A particular use of the numbering process is in the printing of tickets. These are usually printed in multiples of 8 on a single sheet. The imprinting of numbers is carried out upon all eight of the ticket forms of each sheet simultaneously. When the numbering is completed, therefore, there is presented eight full sets of tickets numbered as required.

The imprint means may take any suitable form and will ordinarily be represented in a stationary print location having a readily changeable type so that the progression from zero to may be made with facility. The sheets may be located by hand for realignment to the successively higher denominational positions or an adjustable alignment means may be incorporated in the press or other device to receive the forms. The style and size of digit imprint are, of course, widely variable within these concepts as is the position on the form or sheet at which the imprint is made. The inventive concept is thoughout characterized by simplicity, inexpensiveness and flexibility, permitting consecutive numbering by means and in a manner hereto unknown. While the feed of the individual sheets and their collating has been described in a general way, it is to be understood that it may be effected manually or automatically as needs require.

From the above description it will be apparent that there is thus provided a device of the character described possessing the particular features of advantage before enumerated as desirable, but which obviously is susceptible of modification in its form, proportions, details construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A method of applying consecutive numbers of multiple denominational position to ticket forms or the like without the use of numbering devices, including the steps of putting the form through an imprint station in groups each representing one-tenth the total number of forms, once for each denominational position of the highest number to be applied, the forms of successive groups respectively receiving the imprint of successive numerals from zero to 9 and after the imprinting of each denominational position and before moving to a next adjacent position, collating the group to form new groups of ten in each of which forms appear as sets of ten each or an exponential power thereof in the sequential order of the numbers applied thereto.

2. A method of applying consecutive numbers of multiple denominational position to ticket forms or the like without the use of numbering devices, including the steps of putting the forms through an imprint station in groups, each representing one tenth the total number of forms, once for each denominational position of the highest number to be applied, imprinting a single digit on each form at said station in the lowest denominational position, the digit imprinted on the forms of one group being changed before the forms of the next group are put through said station with a different number from zero to 9 being used for each of the ten groups, and before imprinting said forms in a next higher denominational position separating and rearranging the groups containing sets of ten each of forms into other groups wherein the form of each group are sequentially numbered.

3. A method of applying consecutive numbers of multiple denominational position to ticket forms or the like without the use of numbering device, including the steps of separating the forms into ten groups, imprinting successive forms with a single digit in the lowest denominational position, a different number from zero 9 being used in connection with each group, collating the forms in a different arrangement of ten groups each comprised of a plurality of sets of forms each set comprising ten forms numbered consecutively from zero to 9, again imprinting successive forms with a single digit this time in a next higher denominational position, a different number from zero to 9 being used in connection with each group, separating a first group into the component sets and stacking thereon sets of corresponding group position from the remaining groups to form 100 stacks of forms each numbering from 00 to 99, again imprinting successive forms this time in a next higher denominational position, a different numeral being used in connection with each ten stacks of forms, each ten stacks forming a further group, separating the groups into component sets and collating the groups, and again imprinting the forms with a single numeral in the next higher denominational position, a different numeral being used in connection with each collated group.

4. A method of imprinting plural digit numbers in a consecutive order on ticket forms or the like, including the steps of successively imprinting groups of forms with a single digit which is different for successively different groups of forms, the number of groups being equal to or a multiple of the base of the number system in which the digits are printed, the digits being printed in successive denominational order beginning at the lowest denomination, the number of forms in each group corresponding to a multiple of said base, and alternatively with such imprinting collating the imprinted forms into sets of numerical order and arranged into groups of like numerical order.

5. A method of imprinting plural digit numbers in a consecutive order on ticket forms or the like, including the steps of imprinting successive groups of forms with a single digit in the lowest denominational position, the imprinted digit being different for each group of forms, the number of groups being equal to or a multiple of the base of the number system in which the digits are printed, the number of forms in each group corresponding to a multiple of said base, collating the imprinted forms into sets of numerical order arranged into other groups of like numerical order, the number of sets in each group being equal, imprinting in the next higher denominational position the forms of said groups, a different number being used for each of said groups, and repeating the described collating and imprinting process in successively higher denominational positions until the desired number of positions are filled.

6. A method of imprinting plural digit numbers in a consecutive order on ticket forms or the like, including the steps of imprinting groups of forms in a lowest denominational position with a single digit, the digit changing with each successive group progressing from zero through 9, collating the imprinted forms into other groups comprising sets of forms in the numerical order zero to 9, imprinting the forms with a second digit in the next higher denominational position, utilizing the successive numerals zero through 9 with respect to successively different groups of forms, collating the forms to provide groups comprising sets of forms in the numerical order 00–99, again imprinting the forms with a single digit in the next higher denominational position, the numerals zero through 9 being applied to the respectively different groups as before, collating the forms to produce groups of forms in sets of like numerical order from 000 to 999, and imprinting said groups as before in the next higher denominational position with respective numerals zero through 9, and superimposing the resulting groups one upon another to define a stack of forms in a numerical order from 0000 to 9999.

7. A method according to claim 6, characterized in that said forms are initially separated into ten groups and are successively imprinted and collated in a manner to maintain the relationship between an imprinted digit and a number of forms corresponding to the number of each initial group.

8. A method of imprinting plural digit numbers in a consecutive order on ticket forms or the like, including the steps of providing ten groups of forms, imprinting each group in its lowest denominational position with a single digit, a different digit from zero to 9 being used in connection with the respect groups, collating the imprinted forms to provide ten other groups each comprised of sets of forms numbered from zero to 9; imprinting said forms in a next higher denominational position with a single digit, a different digit from zero to 9 being used in connection with the respective groups, collating the forms to provide other groups made up of sets of forms numbered 00–99, imprinting the forms with a single digit in the next higher denominational position, a different digit from zero to 9 being used in connection with the respective groups, collating the groups to provide other forms comprising sets in a numerical order 000 to 999, and imprinting the forms in a next higher denominational position, a different digit from zero to 9 being used in connection with the respective groups, and putting said groups in order to produce a stack of forms consecutively numbered from 0000 to 9999.

9. A method of imprinting plural digit numbers in a consecutive order on ticket forms or the like, including the steps of imprinting groups of forms in a lowest denominational position with a single digit, the digit changing with each successive group progressing through the base number of the numbering system, collating the imprinted forms into other groups comprising sets of forms in the numerical order of the numbering system, imprinting the forms with a second digit in the next higher denominational position, utilizing successive numerals in the numbering system with respect to successively different groups of forms, collating the forms to provide groups comprising sets of forms in a numerical order as before, again imprinting the forms with a single digit in the next higher denominational position, the numerals of the numbering system being progressively applied to the respectively different groups as before, collating the forms to produce groups of forms in sets of like numerical order in three denominational positions of the numbering system, and imprinting said groups as before in the next higher denominational position with the successive numbers of the numbering system, and superimposing the resulting groups one upon another to define a stack of forms in a numerical order.

10. A method of imprinting plural digit numbers in a consecutive order on ticket forms or the like, including the steps of assembling ticket or like forms into a number of groups, imprinting all the forms of a group in a common denominational position with a single digit which is the same for all the forms of the group, similarly imprinting the forms of the remaining groups in the same denominational position using a different number for each group, separating the imprinted groups of forms and reassembling them into other groups of equal number wherein each group is made up of stacked sets of consecutively numbered forms, again imprinting all the forms of a group thi s time in a second demoninational position which is next adjacent to the first with a single digit which is the same for all the forms of the group similarly imprinting the forms of the remaining groups in the same said next adjacent denominational position using a different number for each group, separating the imprinted groups of forms and reassembling them into sets of like numerical progression, the number of said sets being divisible by the number of original groups to define groups of sets, imprinting all the forms of one of said groups of sets in a third denominational position which is next adjacent to the second position with a single digit which is the same for all the forms, similarly imprinting the forms of the remaining groups of sets in the same said next adjacent denominational position using a different number for each group of sets, the forms now being comprised in groups equal in number to the original number with each group comprising one or more sets of consecutively numbered forms, the numerical progression being the same for the sets of each group and different among the several groups, continuing the alternating imprinting and collating steps if necessary until all the forms of each group are consecutively numbered with the numerical progression being different among the several groups, and stacking the groups one upon another to form a single group of consecutively numbered forms.

11. A method of applying consecutive numbers of multiple denominational position to ticket or other forms, including the steps of separating the forms into a plurality of groups in each of which groups the forms are equal in number, imprinting forms in each group with a number in a common denominational position, a different number being used in connection with each group, separating the imprinted groups of forms to provide other groups wherein the forms are equal in number and wherein each group is made up of sets of consecutively numbered forms, then imprinting all the forms of each group in a succeeding denominational position which is next adjacent to the first mentioned position, a different number being used in connection with each group, separating the imprinted groups of forms into sets of like numerical progression and arranging the sets to provide further groups in each of which the number of forms are equal, then imprinting all the forms of each said group in a third denominational position which is next adjacent the second mentioned position, a different number being used in connection with each group whereupon each group comprises one or more sets of consecutively numbered forms, the numerical progression being the same for the sets within each single group and being different in the sets of the several groups, and further continuing alternate imprinting and grouping steps, if and as necessary, until the required numbered forms are achieved.

12. A method of imprinting plural digit numbers in a consecutive order on ticket forms or the like, said forms having plural digit groups, including the steps of successively imprinting groups of forms with at least certain of said digits of one of said digit groups being in increments of only one which are different for successively different groups of forms, the number of groups of forms being equal to or a multiple of the base of the number system in which the digits are printed, the digits being printed in successive denominational order beginning at the lowest denomination, the number of forms in each group corresponding to a multiple of said base, and alternatively with such imprinting collating the imprinted forms into sets of numerical order and arranged into groups of like numerical order.

13. A method of imprinting plural digit numbers, said digit numbers consisting of plural groups of digits, at least one of said group of digits consisting of plural digit numbers being in consecutive order on ticket forms or the like, including the steps of imprinting said plurality digit number group by successively imprinting groups of forms with a single digit which is different for successively different groups of forms, the number of groups of forms being equal to or a multiple of the base of the number system in which the digits are printed, the digits being printed in successive denominational order beginning at the lowest denomination, the number of forms in each group corresponding to a multiple of said base, and alternatively with such imprinting collating the imprinted forms into sets of numerical order and arranged into groups of like numerical order.

References Cited

The following references, cited by the Examiner, are of record in the patented file of this patent or the original patent.

UNITED STATES PATENTS

| | | | |
|---|---|---|---|
| 1,586,915 | 6/1926 | Pendergast | 270—1 |
| 2,343,880 | 3/1944 | Brownlee | 101—72 X |
| 3,166,309 | 1/1965 | Pidegon | 270—1 |

ROBERT W. MICHELL, Primary Examiner

L. ORENLAND, Assistant Examiner

U.S. Cl. X.R.

270—58